(12) United States Patent
Terao

(10) Patent No.: US 8,102,070 B2
(45) Date of Patent: Jan. 24, 2012

(54) FLOAT-TYPE ENERGY-GENERATING SYSTEM

(76) Inventor: Yutaka Terao, Shizuoka (JP)

( * ) Notice: Subject to any disclaimer, the term of this patent is extended or adjusted under 35 U.S.C. 154(b) by 532 days.

(21) Appl. No.: 12/303,446

(22) PCT Filed: Jun. 8, 2007

(86) PCT No.: PCT/JP2007/061663
§ 371 (c)(1),
(2), (4) Date: Dec. 5, 2008

(87) PCT Pub. No.: WO2007/142338
PCT Pub. Date: Dec. 13, 2007

(65) Prior Publication Data
US 2009/0189396 A1 Jul. 30, 2009

(30) Foreign Application Priority Data
Jun. 8, 2006 (JP) .................................. 2006-159628

(51) Int. Cl.
*F03B 13/00* (2006.01)
(52) U.S. Cl. .......................................................... 290/54
(58) Field of Classification Search .................... 310/43, 310/53–55; 290/43, 53–55
See application file for complete search history.

(56) References Cited

U.S. PATENT DOCUMENTS 4,335,093 A * 6/1982 Salomon ....................... 423/644

FOREIGN PATENT DOCUMENTS

| JP | 63-195088 | 8/1988 |
| JP | 63-195088 A | 8/1988 |
| JP | 5-236698 A | 9/1993 |
| JP | 6-199285 A1 | 7/1994 |
| JP | 07-189884 | 7/1995 |
| JP | 08-261131 | 10/1996 |
| JP | 2001-270496 A | 10/2001 |
| WO | 2005-012079 A1 | 2/2005 |

OTHER PUBLICATIONS

Japanese Unexamined Patent Application Publication No. 7-189884.
Japanese Unexamined Patent Application Publication No. 8-261131.

* cited by examiner

*Primary Examiner* — Dang D Le
(74) *Attorney, Agent, or Firm* — Lowe Hauptman Ham & Berner, LLP

(57) ABSTRACT

The objective of the invention is to provide a float-type energy-generating system that is able to maintain the system's body stably, without listing, while sailing, even in a strong wind, while efficiently generating electricity. The system includes a hull (4) that allows the system to be suspended underwater or to float on seawater, one or more plates (6) that receive the sea wind so as to allow the hull to sail, and one or more power generators (3) that generate electricity by rotating one or more water turbines that use water as a working medium while the hull sails.

6 Claims, 16 Drawing Sheets

Simulated Tacking Trajectory

US 8,102,070 B2

FLOAT-TYPE ENERGY-GENERATING SYSTEM

CROSS-REFERENCE TO RELATED APPLICATIONS

The present Application is based on International Application No. PCT/JP2007/061663, filed on Jun. 8, 2007, which in turn corresponds to Japanese Application No. 2006-159628 filed on Jun. 8, 2006, and priority is hereby claimed under 35 USC §119 based on these applications. Each of these applications are hereby incorporated by reference in their entirety into the present application.

TECHNICAL FIELD

The present invention relates to a energy-generating system that uses wind force on the sea, and more specifically relates to a float-type energy-generating system that captures electrical energy resulting from the rotation of water turbines under water, while the hull(s) to which the system is attached is/are propelled by wind power so that said water turbines are rotated.

BACKGROUND ART

As shown in FIG. 17, a forecast of energy consumption and resources supply indicates that all fossil carbon fuel will be exhausted before 2060 if current levels of energy consumption continue. This means that all of this world's energy resources, including uranium, natural gas, and coal, will be used up. In order to avoid such a situation, it is essential to utilize sustainable natural energy, and especially to utilize hydrogen energy, whose burden on the environment is low.

In order to transform natural energy into hydrogen energy, methods that use wind-power generation have been examined and applied on land. However, it is not realistic to meet all the energy needs of this country by using only on-land wind turbines, because wind turbines set up for that purpose would occupy one-fourth of this nation's land. In contrast, wind-energy-generating systems provided at sea can exploit natural energy across the vast expanses of the oceans.

Known float-type energy-generating systems include the fixed float-type system (hereinafter "FFT system") and the sailing mega-float-type system (hereinafter "SMFT system"). As shown in FIG. 18, an FFT system is configured such that a floating body on which wind-power generators are mounted is moored in the sea. Although the areas where FFT systems can be set are limited due to the wind environment on the seas, FFT systems have high potential because of their low technical barriers. In FIG. 18, reference numerals 40 and 42 refer to a blade-fixation frame and a wind-turbine blade, respectively. An FFT system is not efficient in generating power in such areas, because winds in such areas are not constant throughout the year.

As shown in FIG. 19, an SMFT system is configured such that a very large floating body (mega-float) on which are mounted multiple wind turbines that generate, for example, around 5,000 kW per hour, is floated on international waters without mooring, electricity is generated by wind power, and the generated electrical energy is converted into hydrogen energy. An SMFT system has propulsion devices so that the SMFT system can maintain its position on the sea or be moved, as desired. However, due to financial cost-benefit considerations, the floating bodies on which wind-power-generation devices are mounted are very long, reaching a length of 2 km. As shown in FIG. 20 (it is assumed that a wind blows in the direction from the top to the bottom of the ordinate), an SMFT system has the wind and waves on its sides when it operates on the sea, and therefore the SMFT system moves up and down relative to the wind so as to prevent the floating body from being carried away by the wind. In order to obtain the energy required, hundreds of SMFT systems need to be provided. In FIG. 19, reference numerals 44 and 46 refer to a hull and a wind-turbine blade respectively.

As shown in FIG. 21, the maximum travel speed of an SMFT system is about 10 knots per hour if the SMFT system feathers the propellers of its wind turbines and uses its pod-propulsion devices (called thrusters) at full thrust. If a typhoon is expected to hit the SMFT system, it has to take evasive action in advance, in order to avoid damage to the propellers and other parts, because the travel speed of the SMFT system is low.

Consideration of the energy profit ratio (EPR) and the life cost analysis (LCA) requires that an SMFT system have long-term durability of about 100 years. Accordingly, the structural members of the floating body must be economical and prevent corrosion. Also, maintenance to prevent corrosion by seawater and adherence of marine organisms is necessary. Another problem of SMFT systems is that it is difficult to find a maintenance base for an SMFT system. Because there is no floating dock or building berth as long as 2 km, infrastructure building is also required in order to utilize an SMFT system.

As prior art, Patent Document 1 discloses a sailing energy-generating system that stores electrical energy that is directly or indirectly obtained from the revolution of electric generators on a vessel while the vessel sails. Patent Document 2 discloses an energy-storage device that stores electrical energy that is directly or indirectly generated by wind-powered generators or water-powered generators on a vessel. Patent Document 3 discloses a complex energy-generating system configured such that wind-powered generators are mounted on the deck of a vessel and water-powered generators that use running water are installed inside the vessel.

Although the invention of Patent Document 1 (generating energy by the sailing of a vessel) enables energy to be generated by water turbines that are rotated by the sailing of a vessel propelled by the wind, the shape of the sail is the same as that of a conventional sailing vessel, and therefore the sail is changeable depending on the prevailing wind. Accordingly, the vessel weaves in a strong wind, and therefore the invention of Patent Document 1 is not highly efficient in generating energy. Moreover, Patent Documents 2 and 3 (generating energy by using a combination of wind-powered generators and water-powered generators) also might not be highly efficient in generating energy, because those inventions have problems in that the direction in which the vessel advances is against the prevailing wind or ocean current.

Patent Document 1 Japanese Unexamined Patent Application Publication No. 5-236698
Patent Document 2 Japanese Unexamined Patent Application Publication No. 7-189884
Patent Document 3 Japanese Unexamined Patent Application Publication No. 8-261131

SUMMARY OF THE INVENTION

The objective of the present invention is to provide a float-type energy-generating system that is able to maintain stability of the hull without listing while sailing, even in a strong wind, while efficiently generating electricity.

In order to attain the above objective, the float-type energy-generating system described in the present application includes (1) at least one hull that allows the system to be suspended underwater or to float on the surface of water, (2) at least one plate that receives the sea wind so as to move the hull, and (3) at least one device that generates electricity due to the rotation of a water turbine that uses water as a working medium while the hull moves.

The plates described in the present invention have a trapezoidal shape, are positioned on both the starboard and larboard sides so that the plates face each other, with the tops of the plates being inclined toward the center of the hull, thereby making the distance between the tops of the plates shorter than the distance between the bottoms of the plates.

The plates described in the present invention are configured such that multiple plates are positioned on the hull, and a drive mechanism rotates each plate so that each plate is positioned at an angle relative to the centerline of the hull so that the plate can receive the wind.

The plates described in the present invention are configured such that the drive mechanism positions each plate vertically or at an angle relative to the hull.

The plates described in the present invention have a streamlined shape.

The plates described in the present invention are configured such that each plate bends at both of its ends.

The water turbine described in the present invention is configured such that it is also used as a propulsor to propel the hulls.

The hulls described in the present invention are hulls on both the starboard and larboard sides, with both hulls having a predetermined direction in which to be propelled.

The water turbines described in the present invention are configured such that each water turbine can be folded in the same direction as that of each hull.

The water turbines described in the present invention are configured such that the cross-section of each water turbine is such that minimizes the resistance of water to the water turbines and to the hulls.

The plates described in the present invention are configured such that the cross-section of each plate allows the hulls to obtain a speed that minimizes the resistance of water to the water turbines and to the hulls.

The float-type energy-generating system of the present invention has at least one plate that has the wind, which enables the hull to remain stabile without listing while sailing, even in a strong wind, which enables the system to efficiently generate energy. Even in a strong wind, the plate does not flutter as a canvas sail flutters, and thus the hull can remain stable. Because the system sails while having the wind, it has mobility to be able to move to a wind area that is optimum for the system's functioning.

In the invention, the plates have a trapezoidal shape, the width at the plates' top ends is less than the width at the plates' bottom ends, the plates are positioned on both the starboard and larboard sides so that the plates face each other, with the tops of both sides' plates being inclined toward the center of the hull, so that the distance between the tops of the plates is shorter than the distance between the bottoms of the plates, and thus the system can remain stable without listing while sailing, even in a strong wind, and thus the system can sail stably.

In the invention, a driving mechanism can change the direction of the plates can be changed to a desired angle in the longitudinal direction, and therefore if each plate is positioned, for example, at an angle of 45° relative to the direction of the wind, the hull can sail at an angle of 90° relative to the direction of the wind.

In the invention, masts attached to the plates are positioned by a drive mechanism so as to be perpendicular or slanted relative to the hull, and therefore when the masts are slanted relative to the hull, a lift in the upward direction is exerted to the system so that the system can obtain a lift while it sails.

In the invention, each plate has a streamlined shape, and therefore the resistance that each plate encounters is less than that of a plate that has a rectangular shape.

In the invention, the plate is configured such that each plate bends at its both of its ends, and therefore the plates can generate greater lift, so that the sailing speed of the system can be increased.

In the invention, the water turbines are also used as propulsors to propel the hull, and therefore the mobility of the system is increased, so that the system can sail to a desired destination even when there is no wind.

In the invention, the system is a catamaran that has starboard and larboard side hulls, and therefore the resistance that the system encounters can be decreased greatly.

In the invention, the water turbine can be collapsed in the same direction in which the hull is directed, and therefore the system can enter a shallow-water port and be moored there.

In the invention, the water turbine has a cross-section that enables the resistance of water to the water turbine and to the hull to be minimized, and therefore the system can sail smoothly. If the water turbine's diameter is large, the water turbine decreases the system's sailing speed. At that time, the revolution of the propeller is slow due to the resistance of the water, while the resistance that the system encounters is small. In contrast, if the water turbine's diameter is small, the sailing speed when the system receives the wind is increased. At that time, the turbine's blade revolves fast, because the resistance of the water is low, while the resistance that the system encounters increases. A water turbine of optimal diameter can be selected.

In the invention, each plate has a cross-section that allows the hull to obtain a speed that enables the resistance of water to the water turbine and to the hull to be minimized, and therefore the system can sail smoothly. If the speed of the system is low, the plate must have a larger area in order to obtain lift (propulsion), while if the speed of the system is high, a plate of smaller area will suffice. If the sailing speed while having the wind is higher, the area of the plate can be made smaller, with the plate area size to be chosen to be that at which the resistance of water to the water turbine and to the hull can be minimized.

Still other objects and advantages of the present invention will become readily apparent to those skilled in the art from the following detailed description, wherein the preferred embodiments of the invention are shown and described, simply by of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTIONS OF THE DRAWINGS

REFERENCE NUMBERS USED IN THE DRAWINGS

2 Float-type energy-generating system
3 Energy-generating device
4 Hull
4R Starboard-side body
4L Larboard-side body
6 Plate
10R, 10L Water turbine
14R, 14L Electricity generator
30R Plate group on the starboard side
30L Plate group on the larboard side

BEST MODES FOR CARRYING OUT THE INVENTION

The float-type energy-generating system of the present invention will now be described with reference to the drawings.

Embodiment 1

Figure 1:
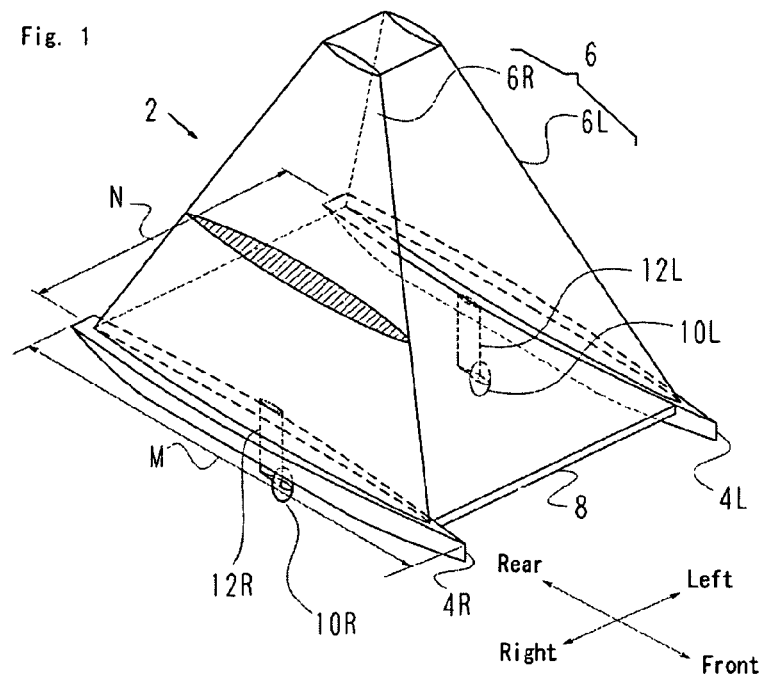
FIG. 1 is a perspective view of a float-type energy-generating system. (Embodiment 1).
Figure 2:
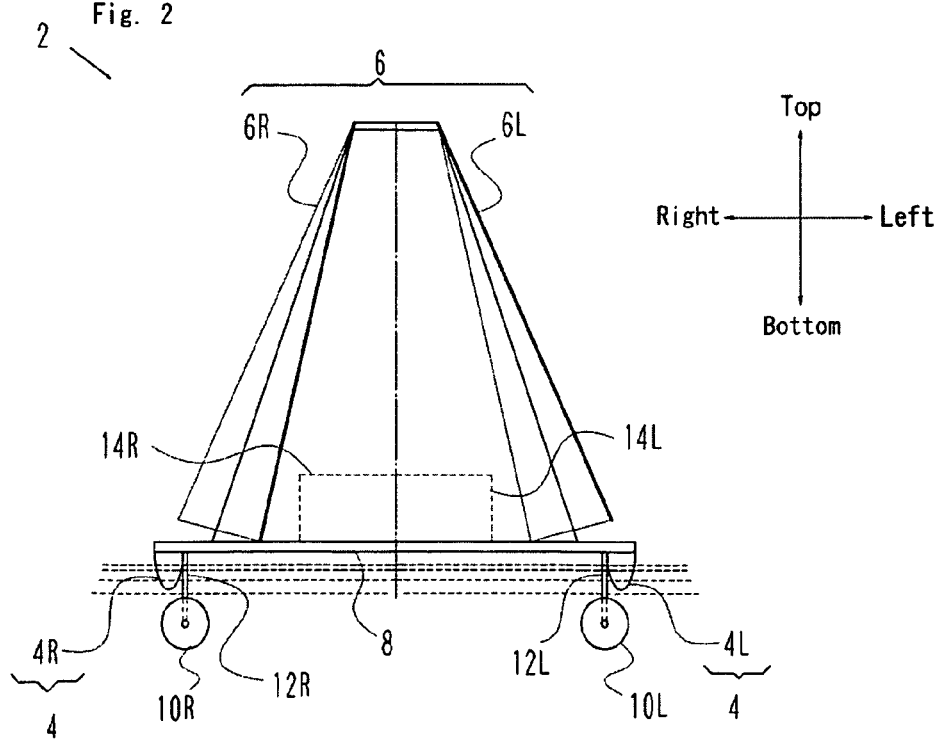
FIG. 2 is an elevation view of the system shown in FIG. 1. (Embodiment 1)
Figure 3:
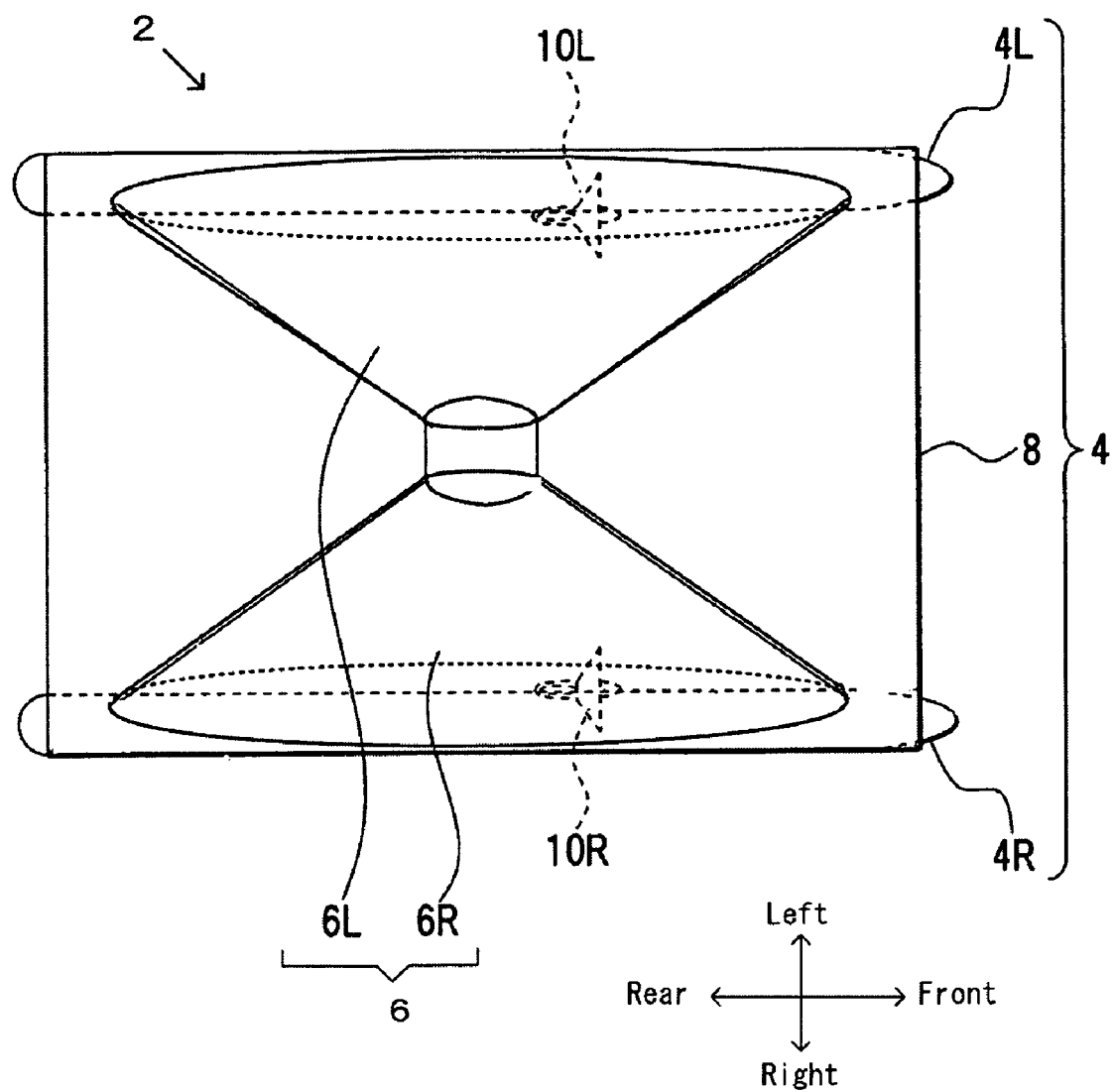
FIG. 3 is a top view of the system shown in FIG. 1. (Embodiment 1)
Figure 4:
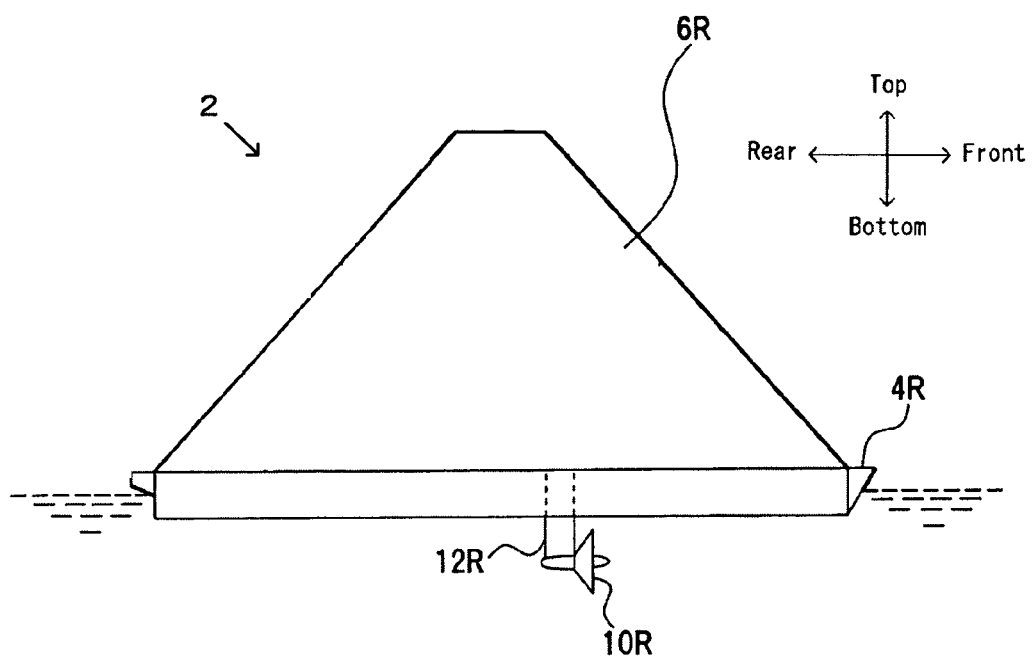
FIG. 4 is a side elevation view of the system shown in FIG. 1. (Embodiment 1)
Figure 5:
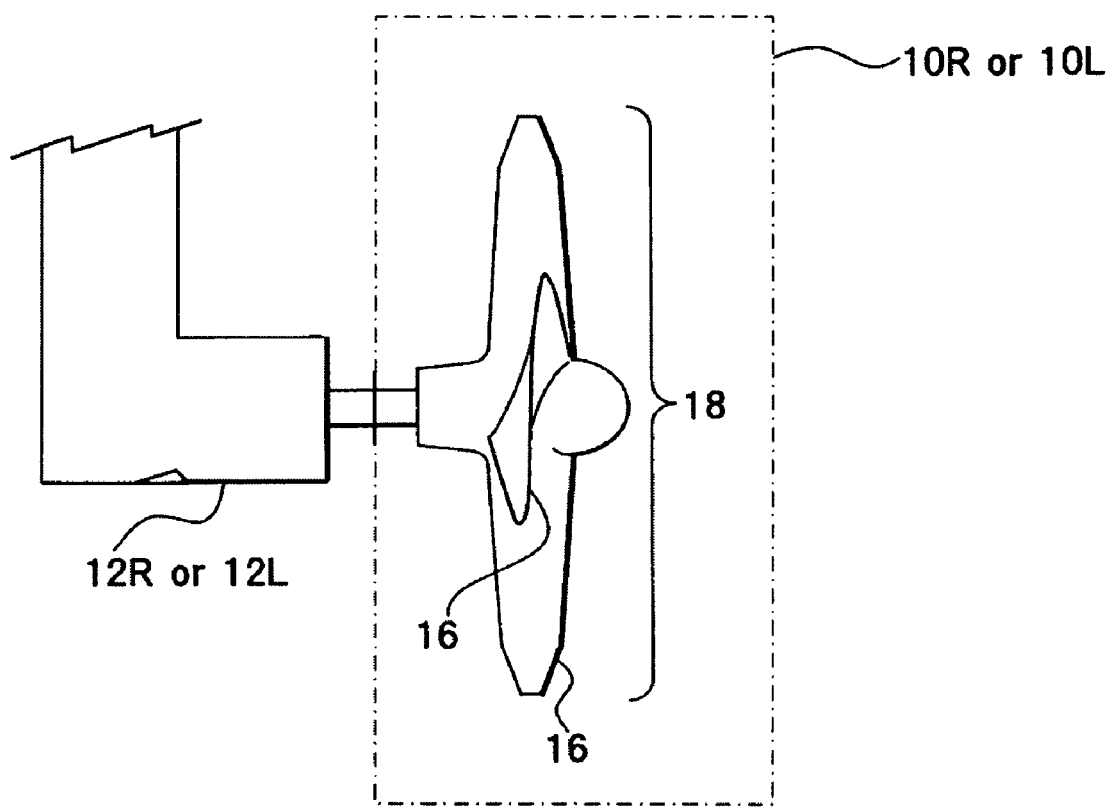
FIG. 5 is shows one example of the configuration of a water turbine. (Embodiment 1)
Figure 6:
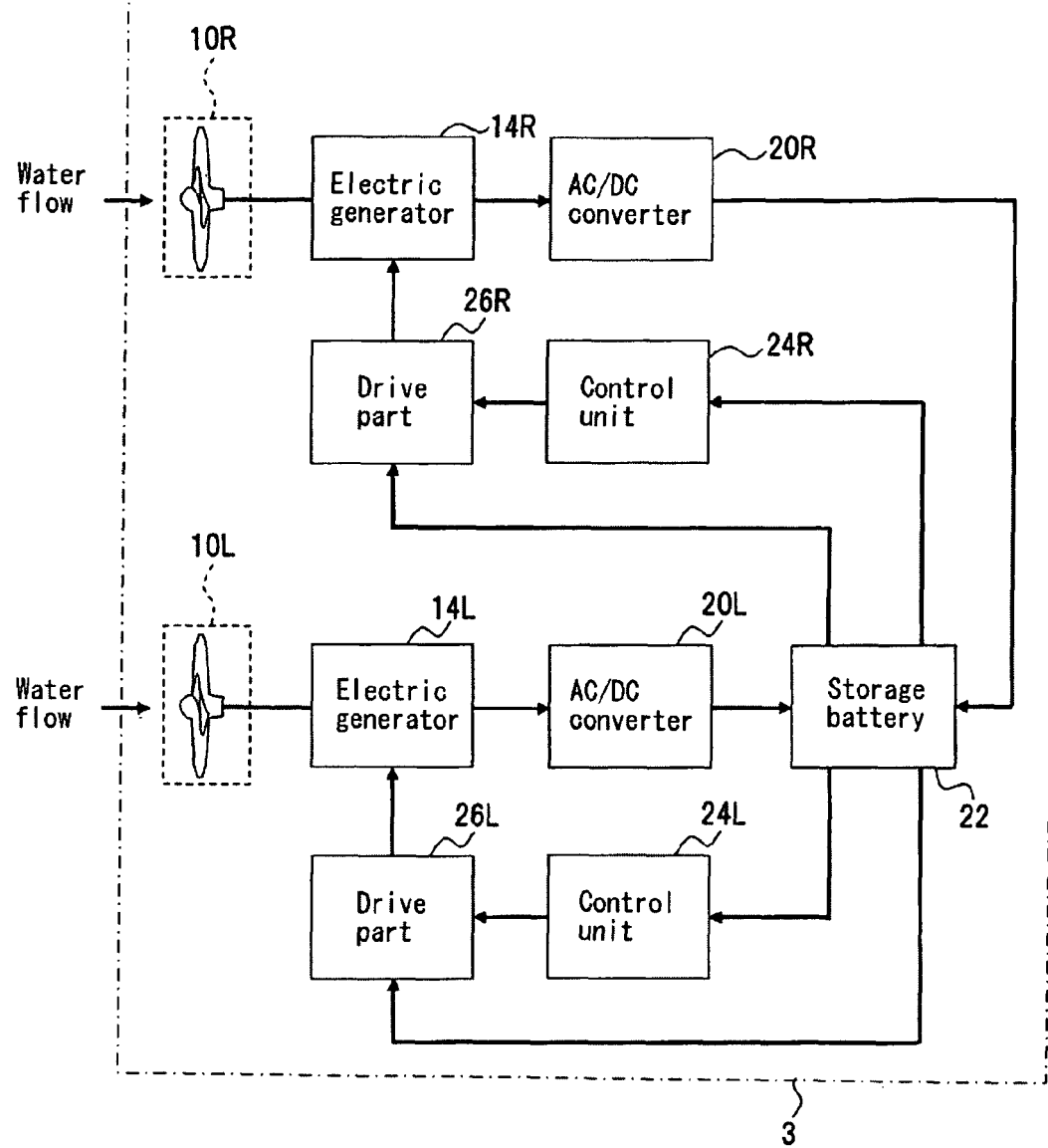
FIG. 6 is a block diagram of a float-type energy-generating system of the present invention. (Embodiment 1)

The first embodiment of the present invention is shown by FIGS. 1-6. FIG. 1 is a perspective view of a float-type energy-generating system, FIG. 2 is an elevation view of the system shown in FIG. 1, FIG. 3 is a top view of the system shown in FIG. 1, FIG. 4 is a side elevation view of the system shown in FIG. 1, and FIG. 5 shows one example of the configuration of a water turbine. FIG. 6 is a block diagram of a power generator. The same reference numbers in different figures represent the same components.

As shown in FIGS. 1 to 4, the float-type energy-generating system 2 includes a hull 4 that allows the system to be suspended underwater or to float on water, and a plate 6 that receives wind at sea so as to allow the hull 4 to sail. The hull 4 is configured as, for example, a catamaran wherein the system includes a starboard-side body 4R and a larboard-side body 4L, and a deck 8 that covers the starboard-side body 4R and larboard-side body 4L and the space between them. Because the system is designed so that the width N between the starboard-side body 4R and the larboard-side body 4L is shorter than the length M of those bodies, the deck 8 has a rectangular shape. However, the deck 8 can have a square shape.

The horizontal cross-section of the plate 6 is such that the plate 6 has a streamlined shape. Also, the plate 6 can be made from synthetic resin, a metallic plate, or other material so as to have a rigid body, and it can be configured such that cloth made of reinforced fiber is stretched over a streamlined-shape framework. The plate 6 includes the starboard-side plate 6R and the larboard-side plate 6L. The plates 6R, 6L are trapezoidal shaped, and the length of the lower base of these trapezoids is the same as the length M of the hull. The trapezoidal-shaped plates 6R, 6L hold the wind. Although the tops of the plates 6R, 6L are connected, a structure that does not connect them can be used. The tops of the plates are inclined toward the center of the hull, thereby making the distance between the tops of the plates less than the distance between the bottoms of the plates. As a result, the hull 4 will never heel.

The hull 4 is provided with underwater water turbines 10R and 10L. The sailing of the hull 4 causes the water turbines 10R and 10L to revolve. The water turbine 10R is situated to the left of the starboard-side body 4R and the water turbine 10L is situated to the right of the larboard-side body 4L. Both turbines are located forward of the center of the hull. The revolutions of the water turbines 10R, 10L are transmitted to electric generators 14R and 14L, respectively, through power transmitters 12R, 12L, respectively. Both electric generators 14R and 14L receive the revolutions so as to generate electricity, and they convert the revolutions into electronic energy.

As shown in FIG. 5, water turbines 10R, 10L each include an underwater propeller 18 that has multiple blades 16. The water turbines 10R, 10L are converters that receive water flows and then convert the flows into a revolving movement. Also, if the water turbines 10R, 10L are driven to revolve by a drive mechanism independently of the water flows, they work as propulsors, which enables the hull 4 to sail when there is no wind. Although the water turbines 10R, 10L are projected from the bottom of the hull 4, a mechanism that collapses the water turbines in the direction of the hull 4 can be provided. Although the diameter of each water turbine 10R, 10L can be as large as tens of meters, the hull can enter shallow water ports if the water turbines are collapsed.

As shown in FIG. 6, the float-type energy-generating system 2 includes a power generator 3. The power generator 3 includes water turbines 10R, 10L and electric generators 14R, 14L. The revolutions obtained by the water turbines 10R, 10L are transmitted to electric generators 14R, 14L, and the AC electrical energy generated by the electric generators 14R, 14L is converted into DC electrical energy by AC/DC converters 20R, 20L and is then accumulated in a storage battery 22. The power generator 3 can be configured such that hydrogen is generated by chemical processing using the generated electrical energy, and the hydrogen can then be accumulated.

The electrical energy accumulated in the storage battery 22 can be supplied to the electric generators 14R, 14L so as to use the generators as electric motors controlled by control units 24R, 24L. Drive parts 26R, 26L use electric power from the storage battery 22 to rotate the electric generators 14R, 14L for use as electric motors. Thus, the water turbines 10R, 10L revolve so as to generate energy to propel the system.

In Embodiment 1, the plates 6 are positioned in such a way on both the starboard-side body and the larboard-side body that the plates face each other and the tops of both plates are inclined toward the centerline between the hulls, making the distance between the tops of the plates 6 shorter than the distance between their bottoms. Therefore, when the hull 4 sails against the wind, as when sailing close-hauled, for example, the hull 4 can stably sail with without listing. Moreover, the positioning of plate 6 allows the plates to attain a large projected area for the wind, and therefore the desired lift (and/or propulsion) can be obtained. Furthermore, a catamaran can both increase the lateral stability of the system and minimize the risk of being overturned by the wind.

Embodiment 2

Figure 7:
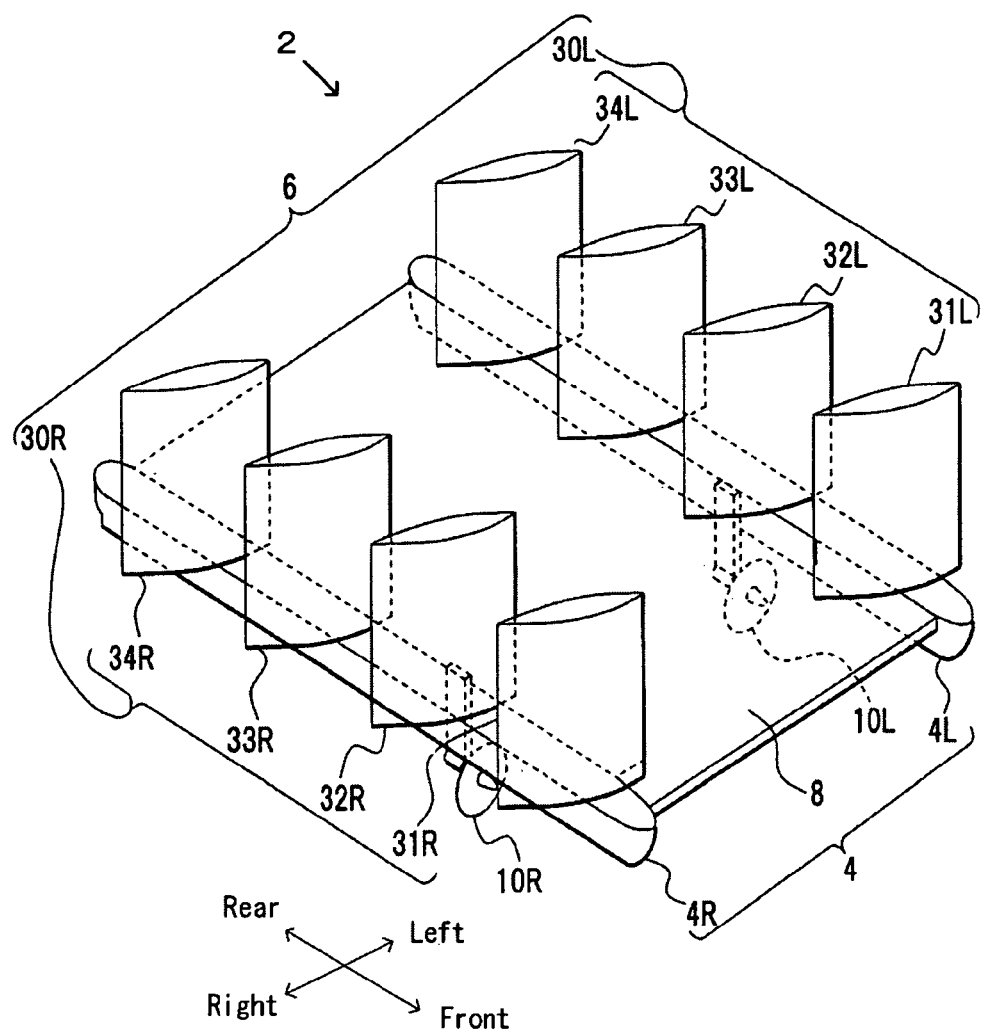
FIG. 7 is a perspective view of a second float-type energy-generating system of the present invention. (Embodiment 2)
Figure 8:
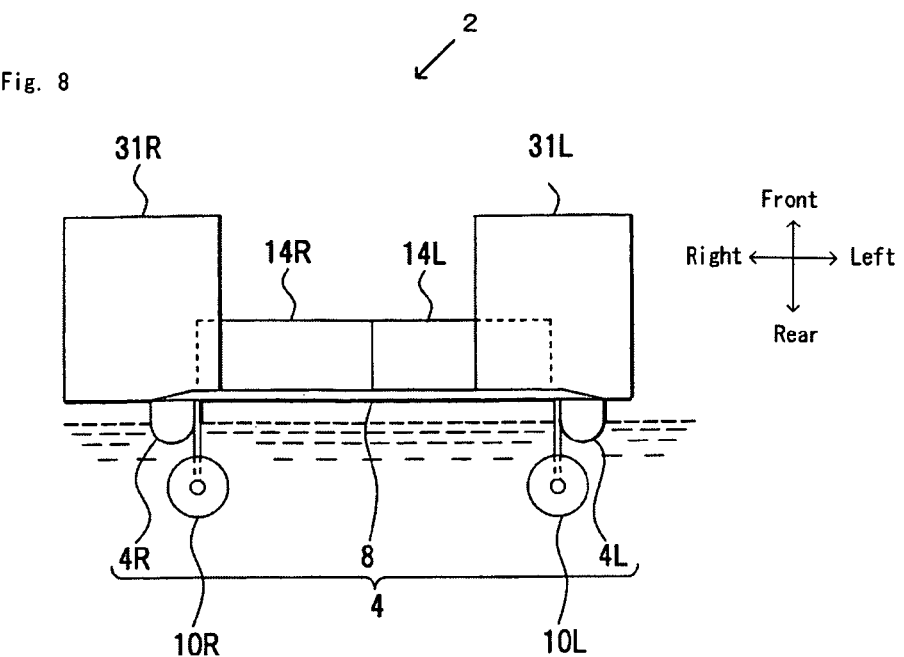
FIG. 8 is an elevation view of the system shown in FIG. 7. (Embodiment 2)
Figure 9:
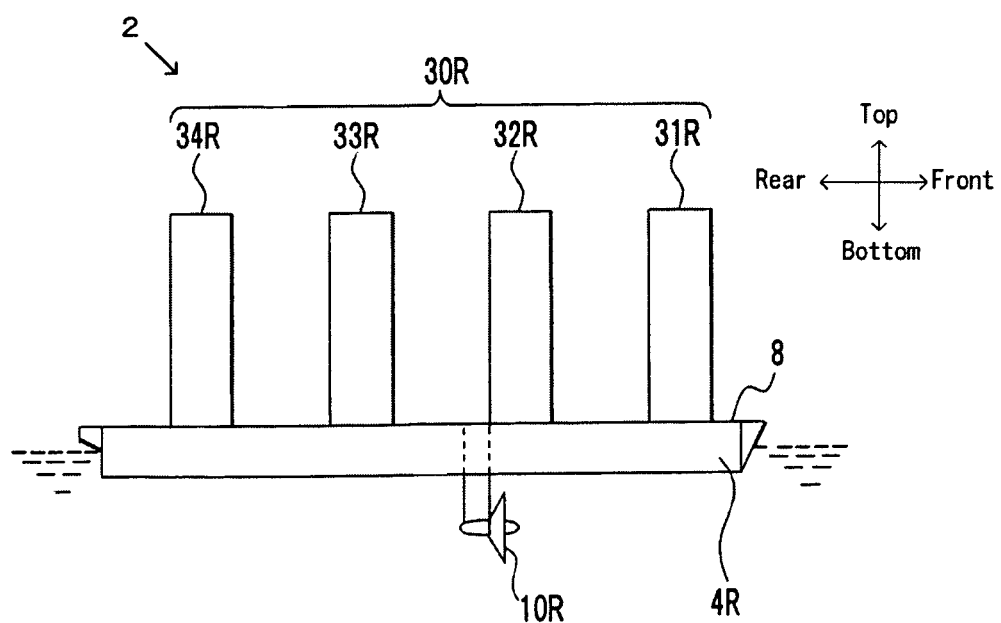
FIG. 9 is a side elevation view of the system shown in FIG. 7. (Embodiment 2)
Figure 10:
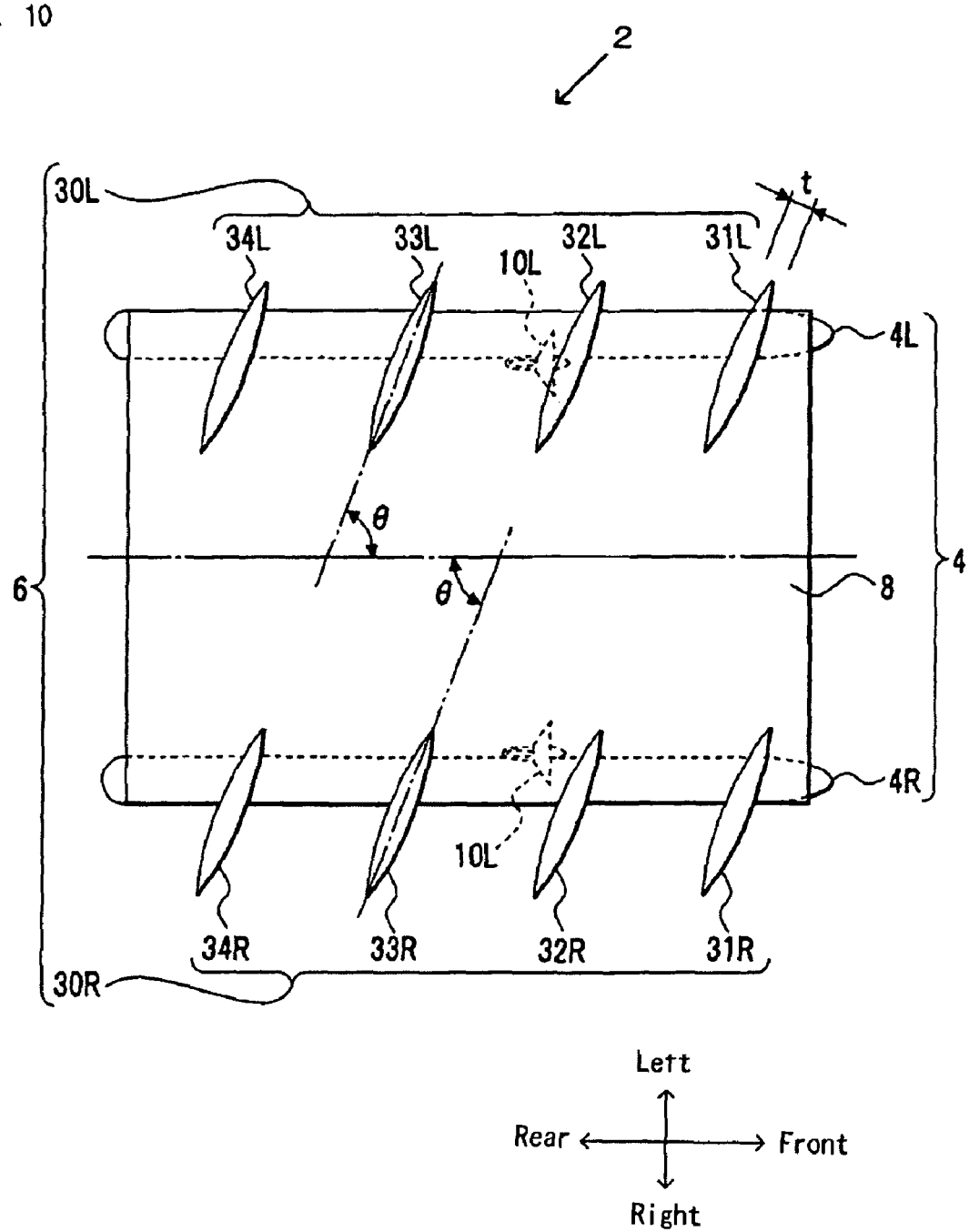
FIG. 10 is a top view of the system shown in FIG. 7. (Embodiment 2)

The second embodiment of the present invention will now be described, with reference to FIGS. 7-10. FIG. 7 is a perspective view of a float-type energy-generating system, FIG. 8 is an elevation view of the system of FIG. 7, FIG. 9 is a side elevation view of the system of FIG. 7, and FIG. 10 is a top view of the system of FIG. 7. The same components that are present in FIGS. 7-10 as well as in FIGS. 1-6 have the same reference numbers in FIGS. 7-10 as they have in FIGS. 1-6.

As shown in FIGS. 7-10, the float-type energy-generating system 2 includes a hull 4 that allows the system to be suspended underwater or to float on seawater, and a plate 6 that receives wind at sea so as to allow the hull 4 to sail. The configuration of the hull 4 is not illustrated here because it is the same as that of Embodiment 1. The plate 6 can be configured in the same manner as in Embodiment 1 in that its horizontal cross-section can have a streamlined shape, can be manufactured to have a rigid body made from synthetic resin, a metallic plate, or other material, and cloth made of reinforced fiber can be stretched over the streamline shaped framework. In Embodiment 2, plate 6 includes, on the starboard side, plate group 30R, which consists of four plates 31R-34R, and on the larboard side, plate group 30L, which consists of four plates 31L-34L.

The plates 31R-34R have a rectangular shape, and each one's length and width are one-fourth of those of the hull. The plates 31R-34R can have, for example, a square shape. The horizontal cross-section of the plate 6 has a streamlined shape that can decrease flow resistance. The plates 31R-34R are located on the center or the inward edge of the starboard side hull 4R, and the spaces between the plates in the longitudinal direction are the same. Because each plate 31R-34R rotates so that its angle can be changed so it can receive the wind, the plates 31R-34R have enough space between them, so that they don't collide with each other while rotating. Each plate 31R-34R is rotated by a drive mechanism (not shown).

The vertical plates 31R-34R and 31L-34L are arranged parallel to each other, so that they all face the same direction, and all of the vertical plates 31R-34R and 31L-34L have the same shape. Although in this embodiment all of the vertical plates have the same shape, each plate can have a different shape. In addition, although the plates 31R-34R and 31L-34L are arranged parallel to each other and, as shown in FIG. 10, are positioned at an angle $\theta$ in relation to the centerline of the hull 4, the angle $\theta$ can be changed, as desired, by a drive mechanism (not shown). Each plate 31R-34R and 31L-34L has a predetermined thickness T. Moreover, the plates 31R-34R and 31L-34L can be inclined in the same manner as plate 6 of Embodiment 1 by a drive mechanism (not shown). In such a case, for example, the plate 6 can be attached to a mast, and the mast can stand vertically or be inclined.

Figures 11, 12:
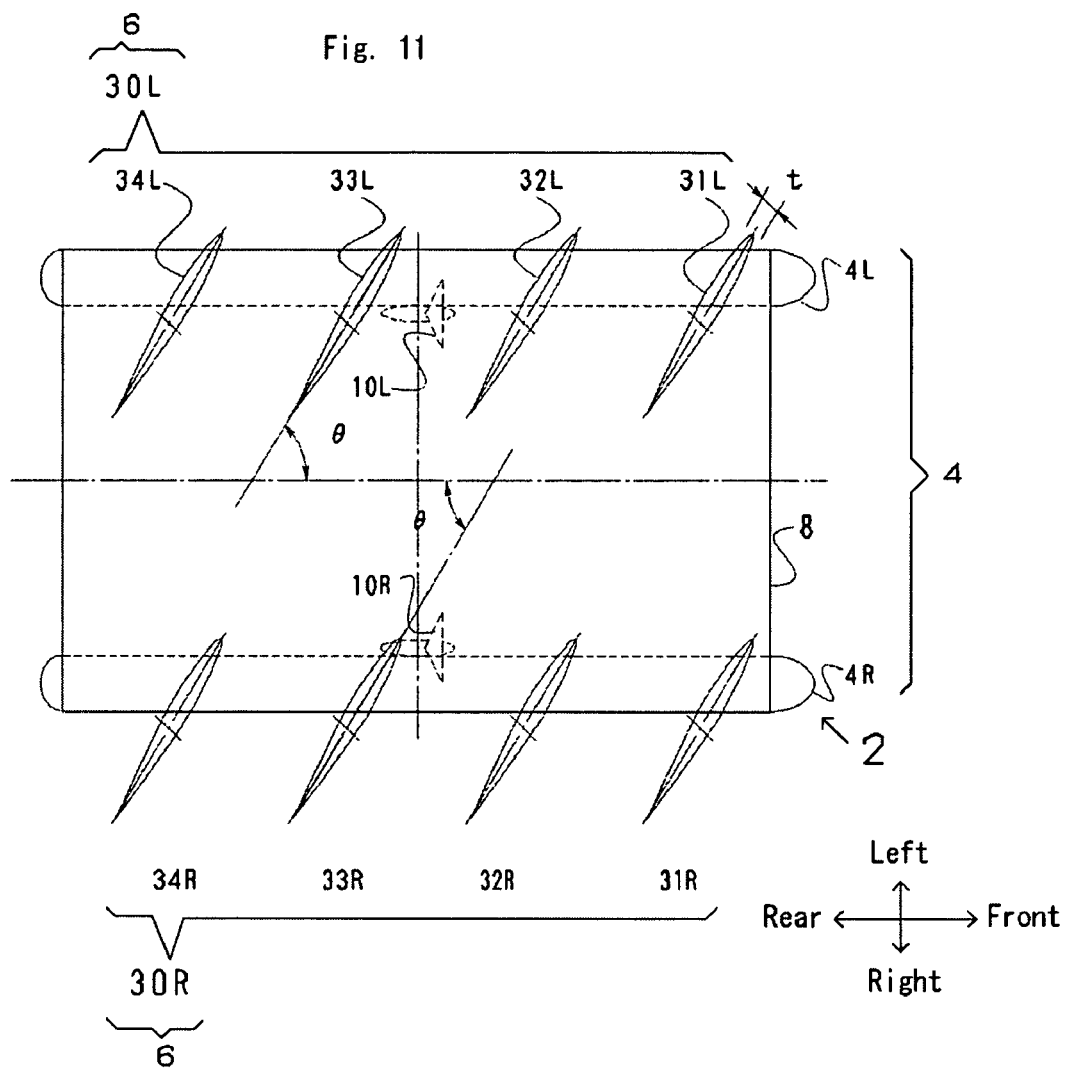
FIG. 11 is a top view of the system shown in FIG. 7, and in which the forward end of each plate is rounded so that the plate has a streamlined shape. (Embodiment 2)
FIG. 12 is a top view of a plate of the system shown in FIG. 7, and in which the plate has two joints at which the plate can be bent. (Embodiment 2)
Figure 13:
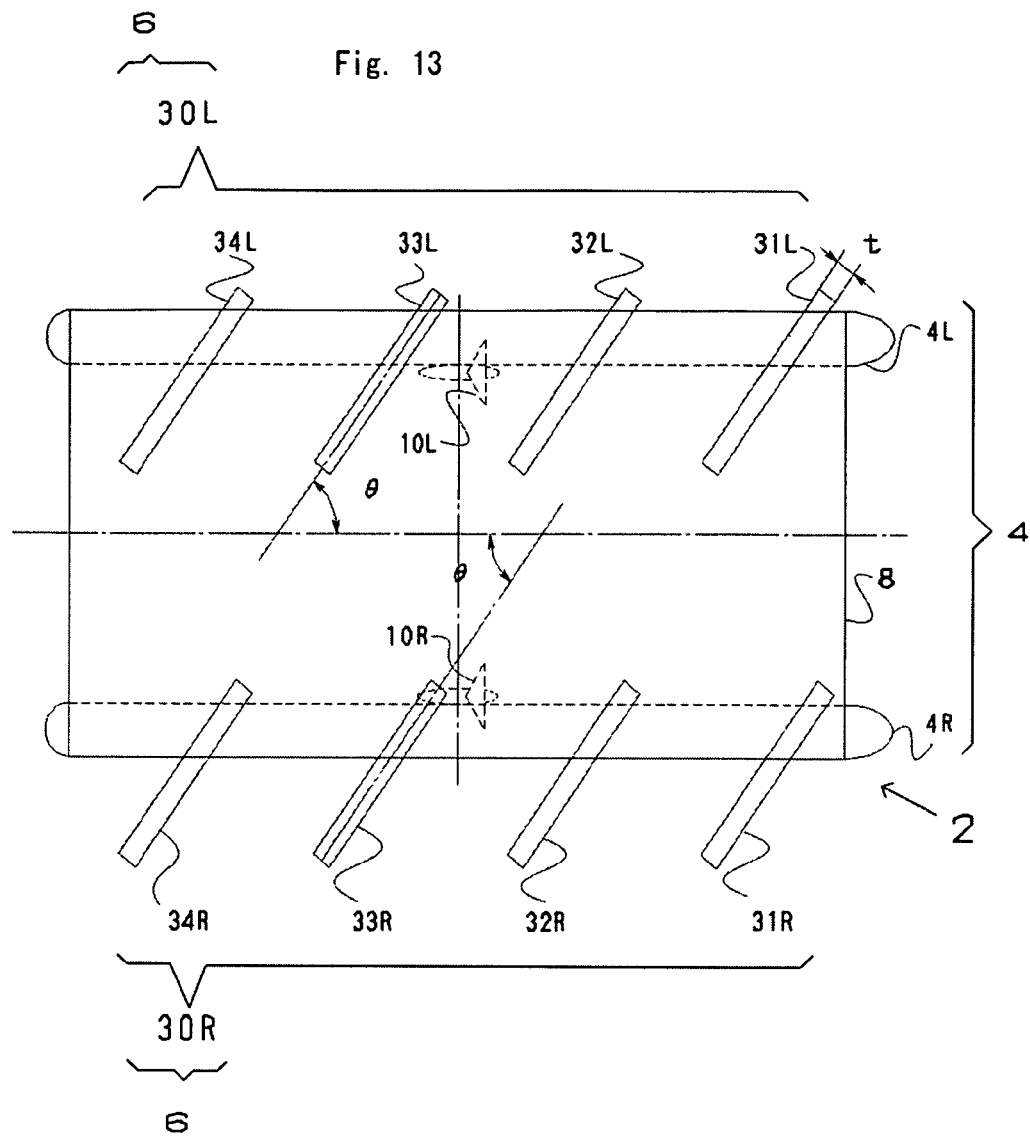
FIG. 13 is a top view of the system shown in FIG. 7, and in which each plate is plank shaped. (Embodiment 2)

FIG. 11 is a top view that shows that the plates 31R-34R and 31L-34L are shaped such that each one has a horizontal cross-section such that the forward end is slightly rounded and the rear end is narrowed, so that each of those plates has a streamlined shape. The streamlined shape in FIG. 11 is a modification of the streamlined shape of FIG. 10. FIG. 13 is a top view that shows plates 31R-34R and 31L-34L having a plank shape. Even if the horizontal cross-section of the plate 6 is rectangular, the plate 6 is able to sail the hull 4. FIG. 12 is a top view in which each plate 6 has two joints so that the plate can be bent at those joints. This feature can be applied to the plank-shaped plate 6 of FIG. 13. If the plate 6 is bent at both its forward and rear joints, as shown in FIG. 12, a stronger lift can be generated, and propulsion can be further increased, which can increase the sailing speed of the hull 4.

In Embodiment 2, the plate 6 is column-shaped and consists of multiple plates 31R-34R and 31L-34L, and therefore increased propulsion can be achieved. The features of the float-type energy-generating system 2 (hereinafter "System 2") of Embodiment 2 will now be described in comparison with the features of the above-mentioned SMFT system (hereinafter "SMFT system").

The equipment required for the System 2 can be made smaller than that of the above-mentioned SMFT system. The System 2 includes sophisticated navigation devices and underwater water turbines 10R, 10L to generate electricity. The float-type energy-generating system 2 uses seawater whose fluid density is 800 times that of the atmosphere, which is used by the wind turbines of the SMFT system, and therefore even if the scale of the System 2 overall is smaller than that of the SMFT system, System 2 can obtain sufficient energy equal to that obtained by the SMFT system.

The System 2 can achieve high sailing performance. (a) The System 2 has sailing equipment that includes a high-performance plate 6, and therefore this system has an increased degree of freedom that allows it to move to optimum wind areas, including areas near typhoons and low-pressure areas, and thus the system can utilize wind energy highly efficiently. (b) Such sailing operations as tacking or jiving are easily made, and therefore the system can stay in a limited sea area, so that the efficiency of electricity generation is increased, whereas the SMFT system can make only tacking maneuvers that realize reciprocating movements that consume many hours. (c) If a group of Systems 2 sails as a fleet for generating power, the fleet occupies a rather small area on the sea, because the maneuverability of each System 2 is high, so that the ability of the various systems 2 to avoid colliding with each other is increased. (d) A System 2 can sail at high speed using only wind energy, and therefore it can easily approach or avoid a typhoon or low-pressure system. In contrast, the SMFT system might be stuck in a hazardous sea area by being unable to avoid a typhoon. (e) Feathering of the blades of a water turbine substantially decreases resistance underwater, and can increase sailing speed. The feathering decreases underwater resistance by more than 60%, increasing the sailing speed by more than 50%. Thus, energy required to move to optimum wind areas is decreased. (f) The System 2 has high steering freedom, and therefore entry into and departure from a port can be made on the system's own power, so that it can transfer hydrogen energy without using shuttle tankers. (g) The electric generators 14R, 14L of System 2 can be used as electric motors if electricity is input into them, and therefore the water turbines can be used as energy-absorbing devices that can be used as propulsors.

Moreover, the System 2 as a whole can be made smaller than the SMFT system because water is used as a working medium. (a) A System 2 whose hull is about 300 meters long can generate as much electricity as can an SMFT system whose length is 2 km. Therefore, a System 2 can be built using existing shipbuilding technologies and existing ship-building docks that are used for building large ships, and in a shorter amount of time than for an SMFT system. (b) A System 2 needs fewer components than an SMFT system does, and therefore it can be manufactured at lower cost than an SMFT system, and the operating costs of a System 2 also are less than those of an SMFT system.

Set forth below are physical considerations about one example of the System 2.

The wind energy is expressed as follows:

Equation 1:

$$\text{Wind Energy} = \frac{1}{2}\rho_A A_A V_A^3 \tag{1}$$

In Equation 1, $\rho_A$ is the air density; $A_A$ is the plate 6 area that receives the wind; and $V_A$ is the velocity of the wind (air). If the fluid density is changed from that of air to that of seawater, then Equation 2:

$$800\rho_A \approx \rho_W \tag{2}$$

In Equation 2, $\rho_W$ is the water density, which is 800 times that of the air density $\rho_A$. Thus, when the medium used for absorbing a specified amount of energy is changed from air to seawater, the following equation applies:

Equation 3:

$$\frac{1}{2}\rho_A A_A V_A^3 = \frac{1}{2}\rho_W A_W V_W^3 \tag{3}$$

In Equation 3, $A_W$ is the area of an underwater propeller, and $V_W$ is the velocity of the water. Here, the velocity of the wind (air) $V_A$=15 m/s, and the velocity of the seawater $V_W$=7.5 m/s (when the system sails on its own). If the velocity of seawater is set at one-half the velocity of the wind (air), and if the ratio $A_R$ between $A_A$ and $A_W$ is as follows, then Equation 4:

$$\frac{A_A}{A_W} = 100 \equiv A_R \tag{4}$$

The same amount of energy can be absorbed.

Assuming that the number of wind turbines is changed from 11 to 1, and if the value of $A_R$ is as follows, then Equation 5:

$$A_R \approx 9 \tag{5}$$

That is to say, almost the same amount of energy can be absorbed.

The above discussion shows that even only one underwater rotor (water turbine) will suffice, and that the size of the rotor can be reduced to one-third of that of the rotor in a wind (air) turbine.

Next, wind propulsion (sailing performance) will be considered. The condition of sailing under a side wind will be considered with the system being operated under conditions such that the hull can achieve its maximum speed and also be able to resist heeling.

This propulsion is equal to the lift L that is applied to a plate 6 that is receiving the wind, and the lift L is expressed as follows:

Equation 6:

$$L = \frac{1}{2}\rho_A S_S V_{Ap}^2 C_L \tag{6}$$

In Equation 6, $S_S$ expresses a sail's area. Assuming that the lift coefficient for maximum efficiency can be used, $C_L$=1. Here, assuming that the lift coefficient for the wind-receiving member of the SMFT system (wind-receiving plate 6) is used, $C_L$=2.

Also, the total resistance (underwater) R is expressed as follows:

Equation 7:

$$R = \frac{1}{2}\rho_W S_P V_W^2 C_P + \frac{1}{2}\rho_W S_H V_W^2 C_D \tag{7}$$

$$= \frac{1}{2}\rho_W V_W^2 (S_P C_P + S_H C_D)$$

In Equation 7, $C_P$ is the resistance coefficient of an underwater propeller, and $C_D$ is the resistance coefficient of the hull 4. Because L=R where Equation 8:

$$\frac{L}{R} = \frac{\rho_A}{\rho_W} \frac{V_W^2 + V_A^2}{V_W^2} \frac{S_A C_L}{(S_P C_P + S_H C_D)} = 1 \tag{8}$$

Then, assuming that $C_L$=2, $C_P$=$C_D$=0.3, and further assuming that the projected area $S_H$ of the hull 4 in the propulsion direction and the projected area SP of the underwater propeller are as follows, then Equations 9, 10:

$$S_H = 10 \times 20 \times 2 = 400 \tag{9}$$

$$S_P = \pi r^2 \approx 1200 \tag{10}$$

These Equations 9 and 10 indicate that a sail area of $S_A$=48,000 m² is required.

This means that if the sail is made of one sheet, a sheet 300 meters long and 160 meters high is required. However, a sail with this aspect ratio is not efficient and is not easy to handle. Therefore, if the SMFT system has catamaran-type hulls 4, and if multiple parasol-type sails are used instead of a sheet 300 meters long and 160 meters high, the above problem will be solved. However, this would be a case where the hull type and the SMFT system's electricity-generating function have been replaced while assuming that the SMFT system can maintain the same output, and in such a case each parameter is not optimized.

The results of applicable numerical calculations will now be explained. Examples of two types of fittings for sailing are shown in FIGS. 1-6 (Embodiment 1) and FIGS. 7-10 (Embodiment 2). Both embodiments include two water turbines 10R, 10L. However, the system can be operated using only one water turbine. The numerical calculations that are presented below are based upon using two water turbines in order to increase robustness during operations, but the area of the water turbines is equal to that of one water turbine. The displacement is assumed to be 100,000 tons, which is one-half of the planned displacement of the SMFT system, but this displacement can easily be increased to 200,000 tons. It is evident that if the width of the system is doubled, the overall resistance of the hull and turbine to the seawater will not increase substantially, and therefore the power-generating performance will decrease only moderately. This is because the amount of resistance depends mainly on the drive of the underwater propeller.

The calculations show that the length of the hull is smaller, approximately one-seventh (300/2000 to be precise) of the length of the hull of the SMFT system, and that an energy-generating system that has one electric generator and a large sail can have a potential generating performance equal to that of the SMFT system. It is possible to configure a more-efficient, low-cost, and high-EPR float-type energy-generating system by appropriately choosing and combining the fittings and electric generators from various types of sailing fittings and various sizes of electric generators, as well as by optimizing the design of the hull and the like.

Moreover, kites can be used to propel the hull to sail. Kites can use the high-speed air currents found at high altitudes, and therefore even kites of small areas can provide sufficient propulsion. However, using kites is not practical because their movement is difficult to control.

Figure 14:
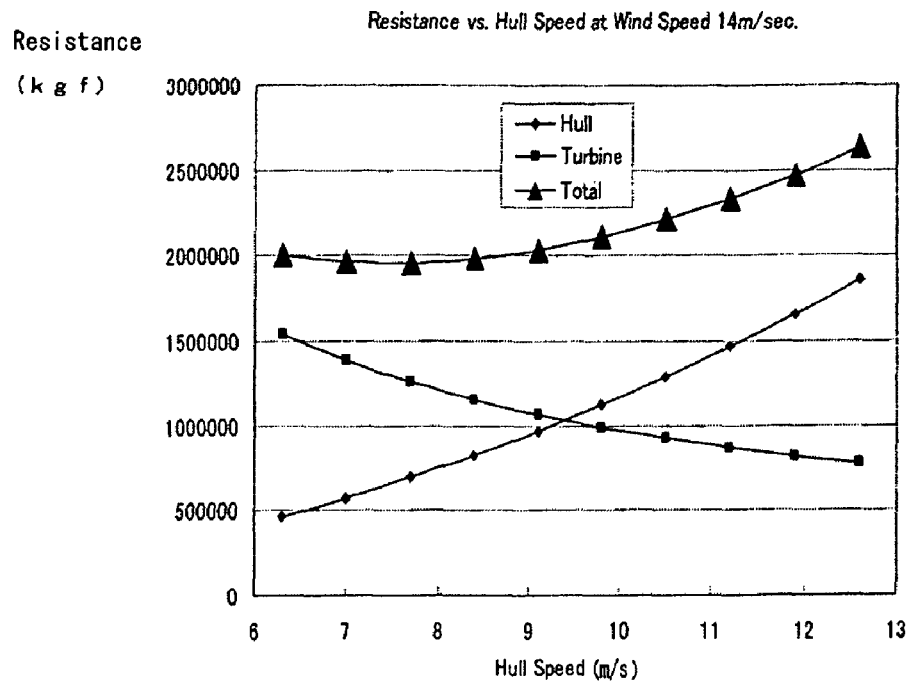
FIG. 14 is a graph that shows the relationship between resistance and hull speed at the wind speed of 14 m/s of a float-type energy-generating system of the present invention, in which the diameter of the water turbine(s) is changed to maintain the same generation capacity.

FIG. 14 is a graph that shows the relationship between resistance and hull speed at the constant generating capacity. If numerical calculations are made assuming that the wind speed is 14 m/s, and if the sailing speed is changed and the diameter of the water turbine(s) is changed to maintain the same generating capacity, the calculation results show the relationship between hull speed and resistance of the hull and turbine to the seawater, as shown in FIG. 14. The above numerical calculations are made assuming that the value of $C_D$ of the water turbines 10R, 10L is 0.6, the wind speed is 14 m/s, the diameter of the water turbine varies according to the sailing speed of 6 m/s-13 m/s, and the system sails while receiving a side wind. FIG. 14 shows that the resistance is minimized at just over 7 m/s, which is 50% of the wind speed and is the optimum sailing speed. Accordingly, the diameter to be used for a water turbine is that at which this resistance is minimized. It should be noted that the smaller the projected area of the water turbine is, the more efficiently electricity is generated. This specified diameter of the water turbine provides high sailing ability, which increases both the system's ability to avoid harm and the safety of the system.

Figure 15:
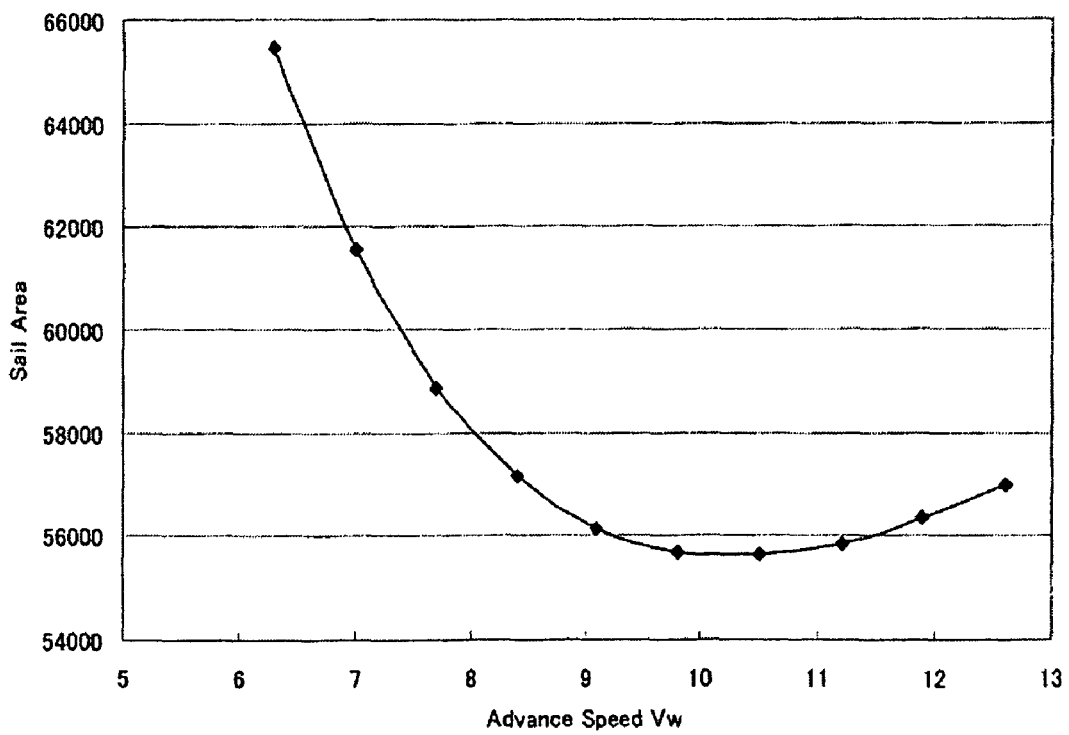
FIG. 15 is a graph that shows the relationship between plate area and the advance speed of a float-type energy-generating system of the present invention.

FIG. 15 is a graph that shows the relationship between the plate area and the advance speed. The result of calculations to determine the required size of the plate area is shown by FIG. 15. This graph indicates that there is an advance speed at which the size of the plate area is optimized. It should be understood that although the advance speed where the plate area is minimized is about 10 m/s, the size of the plate area to be adopted is that which corresponds to an advance speed of about 7 m/s, as shown in FIG. 14, rather than an advance speed of about 10 m/s. That is, the plate area is a little bit larger than a minimized one.

The results of performance analysis regarding the hull are shown by Tables 1 and 2. Table 1 includes wind speed, advance ratio, advance speed, Froude number, air density $\rho A$, seawater density $\rho W$, radius of the wind turbine, area of the wind turbine, total projected area of 11 wind turbines, fluid-density ratio, projected area and radius of a water turbine, natural energy (wind and water flow), increase of energy, equivalent water-turbine area, and water-turbine area ratios to the area of the advance speed of 6.3 m/s.

Table 2 includes equivalent radius, radius ratio, projected hull area, hull resistance, underwater resistance (hull, water turbine, total), and sail area, as well as hull friction resistance and resistance coefficient as the estimated hull friction resistance.

TABLE 1

| Wind speed (m/s) | Advance ratio of the advance speed to the wind speed | Advance speed | Froude number | Air density $\rho A$ | Density of seawater $\rho W$ | Wind turbine Radius (m) | Area (m2) | Total projected area of 11 wind turbines | Air to water density ratio $\rho A/\rho W$ |
|---|---|---|---|---|---|---|---|---|---|
| 14 | 0.45 | 6.3 | 0.116 | 0.13 | 104 | 60 | 11309.7336 | 124407.0691 | 1244.07 |
|  | 0.5 | 7 | 0.129 |  |  |  |  |  |  |
|  | 0.55 | 7.7 | 0.142 |  |  |  |  |  |  |
|  | 0.55 | 7.7 | 0.142 |  |  |  |  |  |  |
|  | 0.6 | 8.4 | 0.155 |  |  |  |  |  |  |
|  | 0.65 | 9.1 | 0.168 |  |  |  |  |  |  |
|  | 0.7 | 9.8 | 0.181 |  |  |  |  |  |  |
|  | 0.75 | 10.5 | 0.194 |  |  |  |  |  |  |
|  | 0.8 | 11.2 | 0.207 |  |  |  |  |  |  |
|  | 0.85 | 11.9 | 0.219 |  |  |  |  |  |  |
|  | 0.9 | 12.6 | 0.232 |  |  |  |  |  |  |

| Water turbine | | Natural energy | | Equivalent | |
|---|---|---|---|---|---|
| Projected area of water turbine (m2) | Radius of water turbine (m) | Wind | Water flow | Increase of energy | water-turbine area (m2) | Water-turbine area ratio |
| 1244.07 | 19.90 | 2.219E+07 | 1.681E+07 | 1 | 1244.071 | 1.000 |
|  |  |  | 2.219E+07 | 1.37174 | 906.928 | 0.729 |
|  |  |  | 2.953E+07 | 1.82579 | 681.388 | 0.548 |
|  |  |  | 2.953E+07 | 1.82579 | 681.388 | 0.548 |

TABLE 1-continued

| | | | |
|---|---|---|---|
| 3.834E+07 | 2.37037 | 524.842 | 0.422 |
| 4.875E+07 | 3.01372 | 412.803 | 0.332 |
| 6.089E+07 | 3.76406 | 330.513 | 0.266 |
| 7.489E+07 | 4.62963 | 268.719 | 0.216 |
| 9.089E+07 | 5.61866 | 221.418 | 0.178 |
| 1.090E+08 | 6.73937 | 184.598 | 0.148 |
| 1.294E+08 | 8 | 155.509 | 0.125 |

TABLE 2

Projected hull area (m2) 450
Hull resistance CD 0.5

| Equivalent radius (m) | Equivalent radius ratio to that of the advance speed of 6.3 m/s | Underwater resistance (kgf) Hull | Underwater resistance (kgf) Water turbine | Total resistance | Sail area (m2) | Estimated friction resistance of hull Friction resistance of hull (kgf) | Estimated friction resistance of hull Resistance Coefficient 0.0015 |
|---|---|---|---|---|---|---|---|
| 19.900 | 1.000 | 4.64E+05 | 1.54E+06 | 2.00E+06 | 6.54E+04 | 7.43E+04 | |
| 16.991 | 0.854 | 5.73E+05 | 1.39EE+6 | 1.96E+06 | 6.15E+04 | 9.17E+04 | |
| 14.727 | 0.740 | 6.94E+05 | 1.26E+06 | 1.95E+06 | 5.89E+04 | 1.11E+05 | |
| 14.727 | 0.740 | 6.94E+05 | 1.26E+06 | 1.95E+06 | 5.89E+04 | 1.11E+05 | |
| 12.925 | 0.650 | 8.26E+05 | 1.16E+06 | 1.98E+06 | 5.72E+04 | 1.32E+05 | |
| 11.463 | 0.576 | 9.69E+05 | 1.07E+06 | 2.04E+06 | 5.62E+04 | 1.55E+05 | |
| 10.257 | 0.515 | 1.12E+06 | 9.90E+05 | 2.11E+06 | 5.57E+04 | 1.80E+05 | |
| 9.249 | 0.465 | 1.29E+06 | 9.24E+05 | 2.21E+06 | 5.56E+04 | 2.06E+05 | |
| 8.395 | 0.422 | 1.47E+06 | 8.67E+05 | 2.33E+06 | 5.59E;04 | 2.35E+05 | |
| 7.665 | 0.385 | 1.66E+06 | 8.16E+05 | 2.47E+06 | 5.63E+04 | 2.65E+05 | |
| 7.036 | 0.354 | 1.86E+06 | 7.70E+05 | 2.63E+06 | 5.70E+04 | 2.97E+05 | |

The performance of the water turbine will now be examined. Assuming that the diameter=1 m, the number of blades is 2, solidity=0.16, $\Lambda=UR/V_W=2$-2.5 when $C_D=0.3$, VW=7 m/s, $UR=2\pi R \times 0.75 \times N$, because the radius of the water turbine is 14 m, and thereby N=0.21-0.26 rps, and therefore the water turbine revolves at 14-16 rpm, where $C_P=0.3$ and $C_T=8$. In this case, the Reynolds number during operation differs greatly from the normal value, and therefore the above assumption should be modified. UR is the representative revolving speed of blades at the 0.75 radius.

With regard to the ship's speed,

Assuming that the hull's length M=300 m, and US=7 m/s, then FN=0.129 (FN is the Froude number, a dimensionless number that relates to the wave-making resistance of a ship.), and therefore this ship is a very-slow-type ship because the ship's body is large. In this case, only the frictional resistance component should be considered, and the wave-making resistance is low. Even if the advance speed reaches 10 m/s, the speed does not reach the HUMP speed range, where the wave-making resistance is high. The type of ship under consideration here is the longest type, where B/L<1/10. (B and L are the width and length, respectively of the ship's body.) In this case, the wave-making resistance component is small, and therefore the value of the component can be about one-tenth to two-tenths of the frictional resistance.

Figure 16:
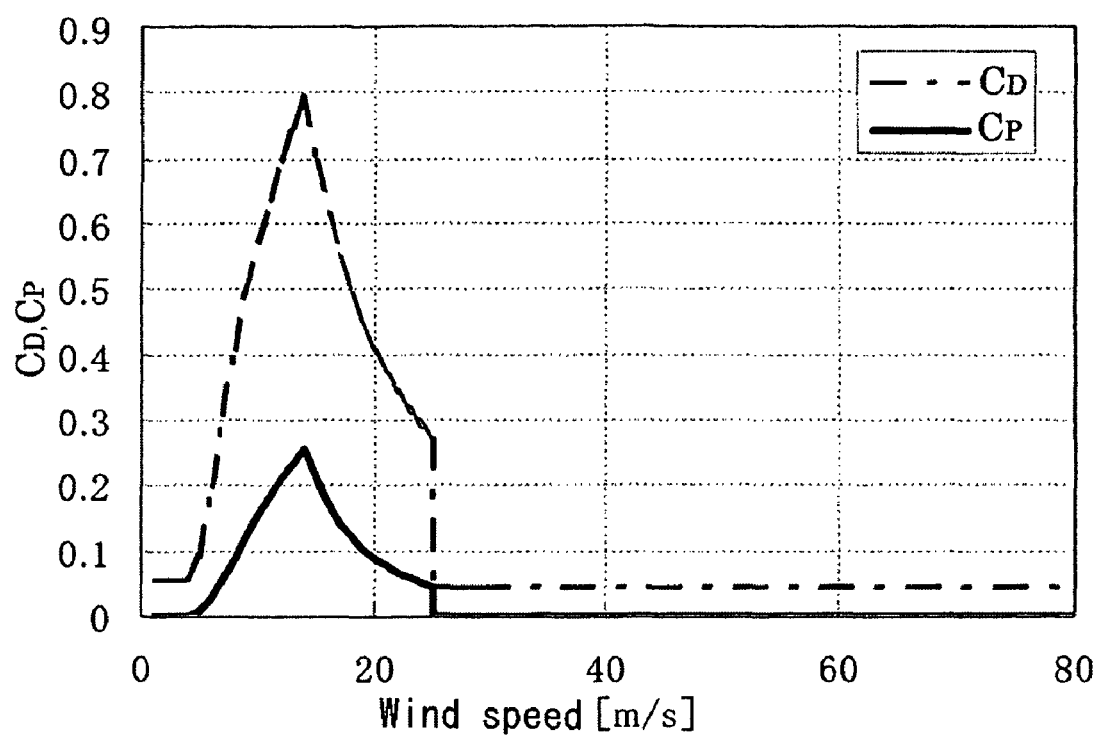
FIG. 16 is a graph that shows the relationship between wind speed and the values of $C_D$ and $C_P$ for a general high-speed wind turbine.
Figure 17:
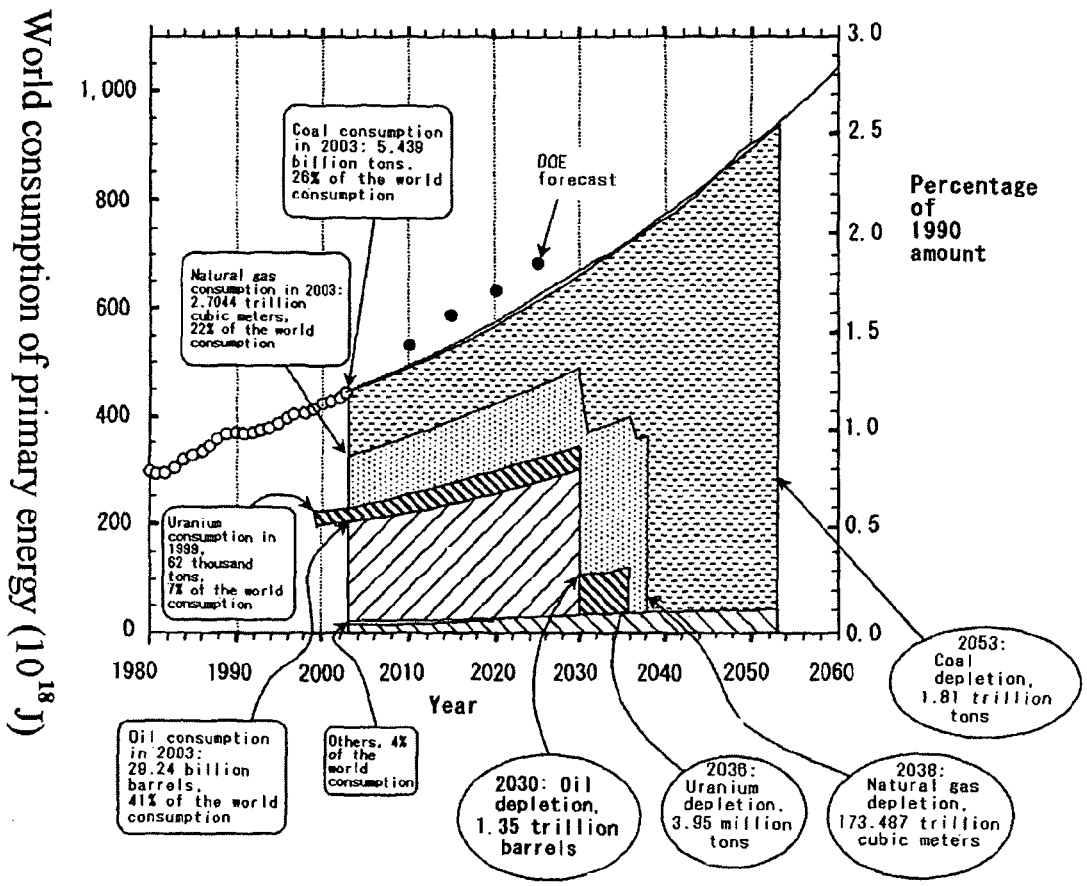
FIG. 17 is a chart that shows a forecast of yearly changes of total energy consumption and the consumption of major energy resources.
Figure 18:
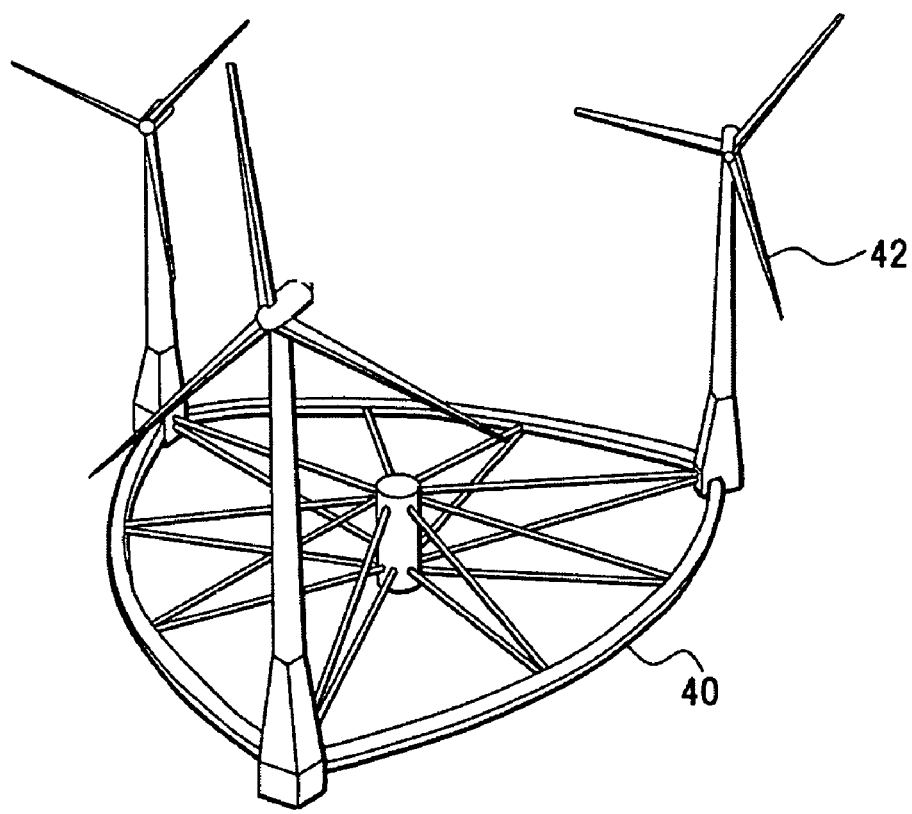
FIG. 18 is a perspective view of a fixed float-type energy-generating system (FFT).
Figure 19:
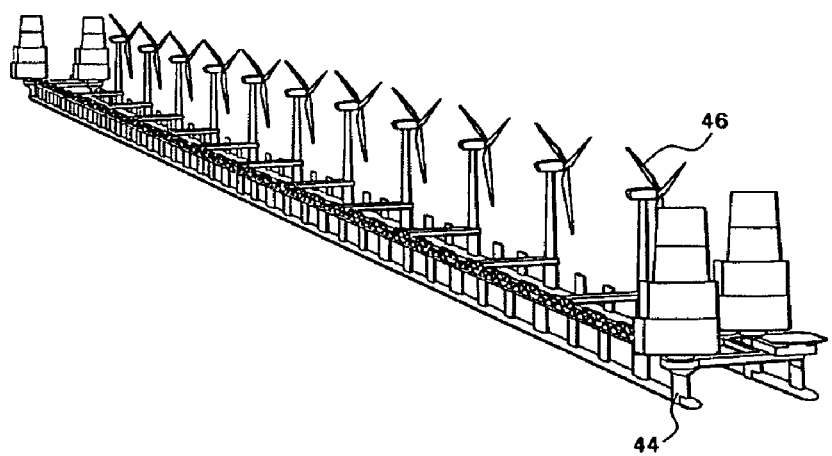
FIG. 19 is a perspective view of a sailing mega-float-type energy-generating system (SMFT system).
Figure 20:
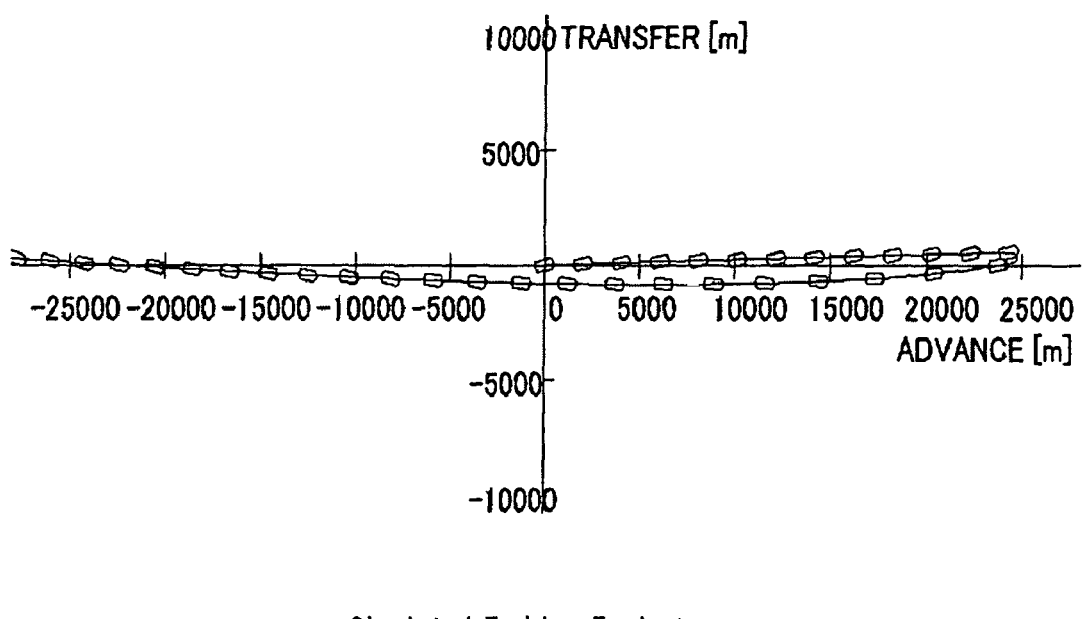
FIG. 20 is a graph that shows a simulated tacking trajectory of the SMFT system of FIG. 16.
Figure 21:
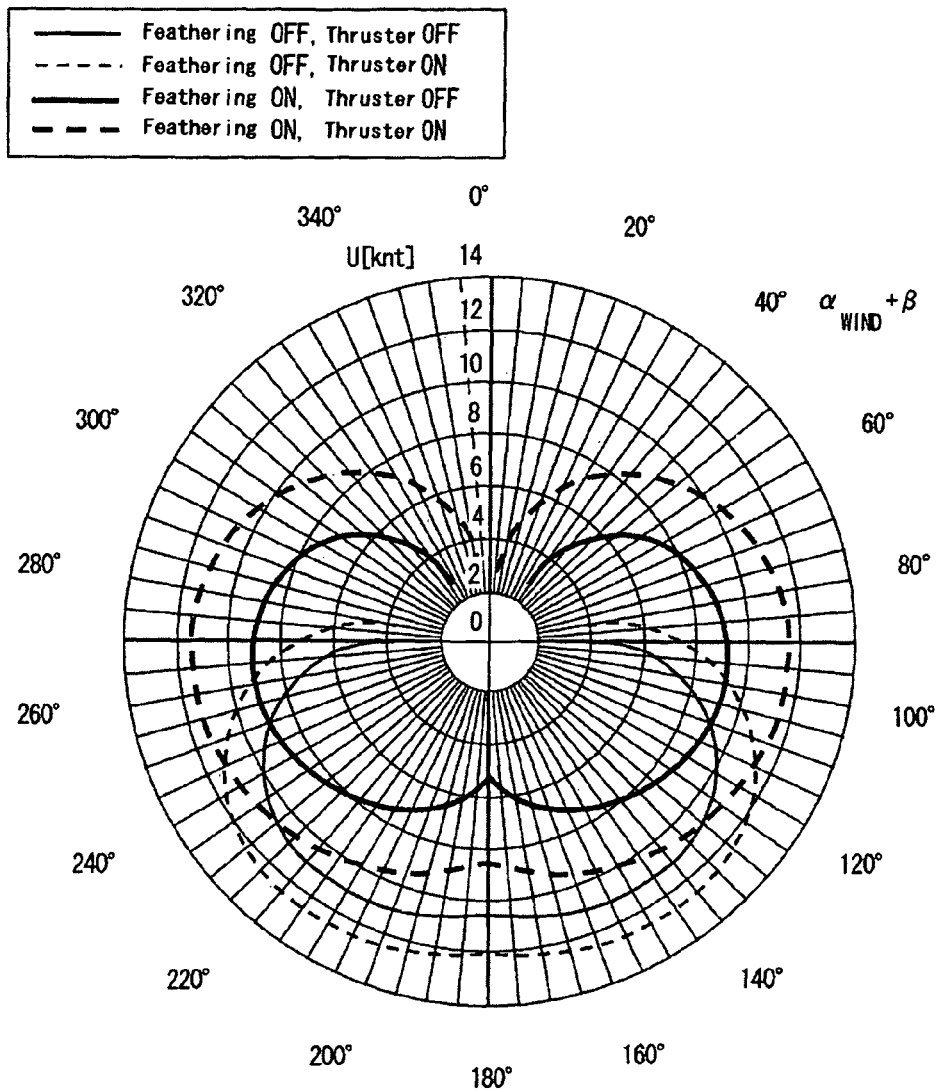
FIG. 21 is a polar diagram of the sailing of the SMFT system of FIG. 16.

FIG. 16 shows the data regarding the water turbine's $C_D$ and the wind turbine's $C_P$. This is an example where the value of $C_D$ is large, reaching as high as 0.8. It has been reported that a water turbine that has two blades shows a $C_D$ value of about 0.6, and therefore the above embodiment includes water turbines 10R, 10L having two blades each. The calculations shown in FIGS. 14, 15 were made using this $C_D$ value.

Table 3 presents rough data regarding the projected area of a water turbine. Table 3 includes wind (air) speed, advance speed of seawater, air density, density of seawater, wind turbine radius, wind turbine area, total projected areas of 11 wind turbines, ratio calculated using an advance speed that is one-half of the wind speed, area of the water turbine, and water turbine radius.

TABLE 3

| | | | | Wind turbine | Wind turbine | Wind turbine | Calculation using advance speed of one-half of wind speed | Calculation using advance speed of one-half of wind speed | Calculation using advance speed of one-half of wind speed |
|---|---|---|---|---|---|---|---|---|---|
| Air Wind speed (m/s) | Seawater Advance speed (m/s) | Air density $\rho A$ | Density of seawater $\rho W$ | Radius (m) | Area (m²) | Total projected area of 11 wind turbines | Ratio of 1:100 of the wind turbines area to the water turbine area | Water turbine area (m²) | Water turbine radius (m) |
| 14 | 7 | 0.13 | 104 | 60 | 11310 | 124407 | 1244 | 1244 | 19.9 |

Other embodiments are discussed below. Although the type of hull 4 discussed above is a catamaran, another type can be used. Although the plate 6 discussed above has high rigidity, a plate over which a flexible sheet, such as a synthetic-resin sheet, is stretched with tension can be used. The plate 6 is controllable in such a way that its angle and height can be adjusted as desired. Although in the above embodiment water turbines 10R, 10L are provided at the right and left sides, respectively, of the hull, more than two water turbines can be mounted on both the right and left sides of the hull, one or more water turbines can be mounted in the center of the system, and the water depth at which the water turbine(s) is/are positioned can be adjusted.

In the embodiments 1 and 2, sailing occurs while receiving a side wind. In this instance, the maximum propulsive force is exerted on the hull 4, and the force that makes the hull 4 list is minimized. Therefore, side-wash-preventing equipment, such as a keel used for a yacht, can be used. If such side-wash-preventing equipment is not provided, the plate 6 is directed to the wind at an angle of 45°, but this is not disadvantageous. If the ship has to luff up into the wind, the form of the hull should be modified. To do this it is sufficient to provide at the bottom of the hull a protrusion, called a bar keel, which is provided to a normal large sailing ship. A keel might suffice, and a retractable keel for a yacht can be used if the keel is to be taken out and put in when needed. The power transmission 12 of an underwater turbine (e.g., water turbines 10R, 10L) can be wing-shaped so that the transmission works as a keel. The water turbines 10R, 10L of the embodiments 1 and 2 are arranged so that they can function as keels.

Although this invention has been described in terms of what is now considered to be its most practical and preferred embodiments, this invention is not limited to the disclosed embodiments; on the contrary, this invention is intended to be able to accommodate various modifications and equivalent arrangements included within the spirit and scope of the appended claims.

The present invention is suited for use as a float-type energy-generating system using wind power on an ocean.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A float-type energy-generating system comprising:
   at least one water turbine using water;
   at least one hull allowing the system to be suspended underwater or to float on a surface of water, and including a starboard side and a larboard side opposite to the starboard side;
   at least two rigid plates respectively positioned on the starboard and larboard sides and facing each other, said at least two rigid plates being adapted to receive wind on the water so as to allow the hull to sail; and
   at least one device generating electricity due to a rotation of said at least one water turbine while the hull sails,
   wherein
   each of the rigid plates has a trapezoidal shape in which an upper width shorter than a lower width,
   each of said at least two rigid plates has a horizontal cross-section which has a streamlined shape in both sides of said rigid plate, and
   tops of said at least two rigid plates are inclined toward a center of the hall.

2. The float-type energy-generating system of claim 1, wherein the water turbine is configured to be used as a propulsor to propel the hull.

3. The float-type energy-generating system of claim 1, wherein said at least one hull includes a starboard-side body on the starboard side that has a predetermined direction in which to be propelled and a larboard-side body on the larboard side that has a predetermined direction so as to be propelled parallel to the starboard-side body.

4. The float-type energy-generating system of claim 1, wherein the water turbine is collapsed in the same direction in which the hull is directed.

5. The float-type energy-generating system of claim 1, wherein the water turbine has a cross-section that minimizes the resistance of water to the water turbine and to the hull.

6. The float-type energy-generating system of claim 1, wherein each said of the rigid plates has a cross-section that allows the hull to obtain a speed that minimizes the resistance of water to the water turbine and to the hull.

* * * * *